United States Patent
Koujiro

(10) Patent No.: US 11,647,138 B2
(45) Date of Patent: May 9, 2023

(54) IMAGE FORMING APPARATUS, RECORDING MEDIUM RECORDING CONTROL PROGRAM, AND CONTROL METHOD

(71) Applicant: SHARP KABUSHIKI KAISHA, Sakai (JP)

(72) Inventor: Takuya Koujiro, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/729,611

(22) Filed: Apr. 26, 2022

(65) Prior Publication Data
US 2022/0311893 A1   Sep. 29, 2022

Related U.S. Application Data

(63) Continuation of application No. 17/150,374, filed on Jan. 15, 2021, now Pat. No. 11,343,398.

(30) Foreign Application Priority Data

Jan. 17, 2020 (JP) .............................. JP2020-005596

(51) Int. Cl.
    *H04N 1/00* (2006.01)
(52) U.S. Cl.
    CPC ..... *H04N 1/00721* (2013.01); *H04N 1/00424* (2013.01); *H04N 1/00456* (2013.01);
    (Continued)
(58) Field of Classification Search
    CPC .......... A63F 2300/66; A63F 2300/8017; A63F 13/52; A63F 13/803; A63F 2300/64;
    (Continued)

(56) References Cited

U.S. PATENT DOCUMENTS 5,282,187 A * 1/1994 Lee .................... H04N 1/32112
6,285,842 B1 * 9/2001 Katamoto .......... H04N 1/00411
                                                      399/81
(Continued)

FOREIGN PATENT DOCUMENTS

JP          2018-121237 A      8/2018

OTHER PUBLICATIONS

Non-Final Office Action dated Sep. 15, 2021 for U.S. Appl. No. 17/150,374.

(Continued)

*Primary Examiner* — Negussie Worku
(74) *Attorney, Agent, or Firm* — ScienBiziP, P.C.

(57) ABSTRACT

An image forming apparatus includes an image reading unit. When printing a postcard is selected, a preview screen including a preview image about an image on a communication side of the postcard read by the image reacting unit is displayed on a display. At this occasion, an instruction image indicating an orientation of an address side of the postcard is also displayed. When it is instructed to turn over the preview image on the communication side, the preview screen including the preview image on the address side is displayed on the display. When the orientation of the address side and the orientation of the communication side do not coincide with each other, or when they are not as intended by a user, printing is performed after the image on the communication side is rotated according to the user's operation.

11 Claims, 12 Drawing Sheets

(52) U.S. Cl.
CPC ..... *H04N 1/00602* (2013.01); *H04N 1/00689* (2013.01); *H04N 1/00726* (2013.01)

(58) Field of Classification Search
CPC ........ A63F 2300/6615; A63F 2300/408; A63F 2300/50; H04N 1/00424; H04N 1/00244; H04N 1/00307; H04N 1/00411; H04N 1/00413; H04N 1/00432; H04N 1/00435; H04N 1/00474; H04N 1/00482; H04N 1/00973; H04N 2201/0039; H04N 2201/0074; H04N 2201/0094; H04N 2201/0096; H04N 1/00456; H04N 1/00602; H04N 1/00689; H04N 1/00721; H04N 1/00726; G03G 15/502; G06F 3/041; G06F 3/0488; G06F 3/04886; G06F 3/1204; G06F 3/1256; G06F 3/1292; G06F 3/1454; G06F 3/147; G09B 9/05; G09G 2320/08; G09G 2340/02; G09G 2370/022; G09G 2370/04; G09G 5/42; G06T 15/00; G06T 15/04; G06T 15/20; G06T 15/40
USPC ........................................................ 358/474
See application file for complete search history.

(56) References Cited

U.S. PATENT DOCUMENTS

| | | | |
|---|---|---|---|
| 7,140,769 B2 * | 11/2006 | Kay | A61B 6/14 378/165 |
| 7,483,166 B2 | 1/2009 | Kadoi et al. | |
| 7,821,663 B2 * | 10/2010 | Yamada | G06F 3/1208 358/1.15 |
| 8,102,380 B2 | 1/2012 | Ishigaki et al. | |
| 8,269,993 B2 * | 9/2012 | Takatani | H04N 1/00774 715/764 |
| 9,069,392 B2 | 6/2015 | Tanaka | |
| 9,146,624 B2 | 9/2015 | Zhao et al. | |
| 10,521,174 B2 | 12/2019 | Asai | |
| 10,623,587 B2 * | 4/2020 | Tsukamoto | H04N 1/00029 |
| 10,627,767 B2 * | 4/2020 | Miyahara | H04N 1/00575 |
| 10,958,798 B2 * | 3/2021 | Harada | H04N 1/0044 |
| 11,303,771 B2 * | 4/2022 | Narita | H04N 1/00506 |
| 2006/0279528 A1 | 12/2006 | Schobben et al. | |
| 2010/0079494 A1 * | 4/2010 | Sung | G06F 3/0346 345/650 |
| 2010/0123928 A1 * | 5/2010 | Morimoto | H04N 1/00721 358/1.15 |
| 2011/0134469 A1 * | 6/2011 | Kuroda | H04N 1/00416 358/1.15 |
| 2011/0199629 A1 * | 8/2011 | Sensu | H04N 1/00448 358/1.13 |
| 2011/0235109 A1 * | 9/2011 | Yamaguchi | G06F 3/0485 358/1.15 |
| 2013/0169981 A1 | 7/2013 | Takahashi | |
| 2013/0314724 A1 * | 11/2013 | Tamura | H04N 1/3875 358/1.2 |
| 2014/0092427 A1 | 4/2014 | Nakamura et al. | |
| 2015/0117890 A1 * | 4/2015 | Yamada | G03G 15/502 399/81 |
| 2016/0062636 A1 | 3/2016 | Jung et al. | |
| 2019/0129585 A1 | 5/2019 | Sawano et al. | |
| 2020/0250805 A1 | 8/2020 | Tsukamoto | |
| 2021/0227084 A1 | 7/2021 | Koujiro | |

OTHER PUBLICATIONS

Notice of Allowance and Fee(s) Due dated Feb. 7, 2022 for U.S. Appl. No. 17/150,374.

* cited by examiner

CASE OF VERTICAL TURNING

CASE OF HORIZONTAL TURNING

IMAGE FORMING APPARATUS, RECORDING MEDIUM RECORDING CONTROL PROGRAM, AND CONTROL METHOD

BACKGROUND OF THE INVENTION

Field of the Invention

The present invention relates to an image forming apparatus, a recording medium recording a control program, and a control method, and more particularly relates to, for example, an image forming apparatus, a recording medium recording a control program, and a control method for forming an image on an image recording medium.

Description of the Background Art

One example of this type of an image forming apparatus is disclosed in Japanese Unexamined Patent Application Publication No. 2018-121237. An MFP device, which is one example of the image forming apparatus disclosed in Japanese Unexamined Patent Application Publication No. 2018-121237 discloses that, in a postcard printing process, both sides of a postcard are scanned by the MFP device, image data including the scanned images on the both sides are transmitted to an information processing terminal, and images on an address side and a communication side are displayed side by side on a display of the information processing terminal.

SUMMARY OF THE INVENTION

However, in the background art, since it is not possible to know a relationship between the orientation of a postcard set in a paper feed cassette or a paper feed tray of an image forming apparatus, and the orientation of a scanned image of the postcard, it is necessary to determine whether the postcard (document) is scanned in a correct orientation, while viewing a printing result. Therefore, when the orientation of the scanned image of the postcard is different from the orientation of the postcard set in the paper feed cassette or the paper feed tray of the image forming apparatus, a printing result intended by a user cannot be acquired.

In view of the above, a main object of the present invention is to provide a novel image forming apparatus, recording medium recording control program, and control method.

Another object of the present invention is to provide an image forming apparatus, a recording medium recording a control program, and a control method capable of forming an image according to an orientation of an image recording medium set in a paper feed cassette or a paper feed tray of the image forming apparatus.

A first invention is directed to an image forming apparatus including a paper feeder in which an image recording medium having a first image formed on at least one surface or a predetermined printing surface is set. The image forming apparatus includes: an image reader that reads, from a document placed on a document table, a second image to be formed on the other surface or the printing surface of the image recording medium when an operation input of a user is detected; a display unit that causes a display to display the second image read by the image reader, together with orientation information indicating at least an orientation of the first image or an orientation of a non-printing surface being a back side of the printing surface; and a direction changer that rotates an orientation of the second image by a predetermined angle when the operation input of the user is detected.

A second invention depends on the first invention, wherein the display unit causes the display to display the first image or an image on the non-printing surface when the operation input of the user is detected.

A third invention depends on the second invention, wherein the display unit causes the display to hide the first image or the image on the non-printing surface when the second image is displayed on the display.

A fourth invention depends on the third invention, wherein, when the operation input of the user is detected in a state that the second image is displayed on the display, the display unit causes the display to display the first image or the image on the non-printing surface, and causes the display to hide the second image.

A fifth invention depends on any one of the first to fourth inventions, wherein the orientation information is an image of an arrow indicating an orientation of the one surface on which the first image is formed or the non-printing surface, and the display unit causes the display to display the image of the arrow and the second image side by side.

A sixth invention depends on the first invention, wherein the orientation information is the first image or an image on the non-printing surface, and the display unit causes the display to display the first image or the image on the non-printing surface, and the second image side by side.

A seventh invention depends on any one of the first to sixth inventions, and further includes a setter that sets a way of turning the image recording medium when the image recording medium is printed, wherein the display unit causes the display to display the second image read by the image reader in an orientation according to a way of turning specified by the setter.

An eighth invention is directed to a recording medium recording a control program for an image forming apparatus including a paper feeder in which an image recording medium having a first image formed on at least one surface or a predetermined printing surface is set. The control program causes a processor of the image forming apparatus to execute a process of reading, from a document placed on a document table, a second image to be formed on the other surface or the printing surface of the image recording medium when an operation input of a user is detected; a process of displaying, on a display, the second image read in the reading process, together with orientation information indicating at least an orientation of the first image or an orientation of a non-printing surface being a back side of the printing surface; and a process of rotating an orientation of the second image by a predetermined angle when the operation input of the user is detected.

A ninth invention is directed to a control method of an image forming apparatus including a paper feeder in which an image recording medium having a first image formed on at least one surface or a predetermined printing surface is set. The control method includes: (a) reading, from a document placed on a document table, a second image to be formed on the other surface or the printing surface of the image recording medium when an operation input of a user is detected; (b) displaying, on a display, the second image read in the reading, together with orientation information indicating at least an orientation of the first image or an orientation of a non-printing surface being a back side of the printing surface; and (c) rotating an orientation of the second image by a predetermined angle when the operation input of the user is detected.

According to the present invention, it is possible to form an image according to an orientation of an image recording medium set in a paper feed cassette or a paper feed tray of an image forming apparatus.

The above object, other objects, features, and advantages of the present invention will be more apparent from the following detailed description of an embodiment with reference to the drawings.

DESCRIPTION OF THE PREFERRED EMBODIMENTS

Figure 1:
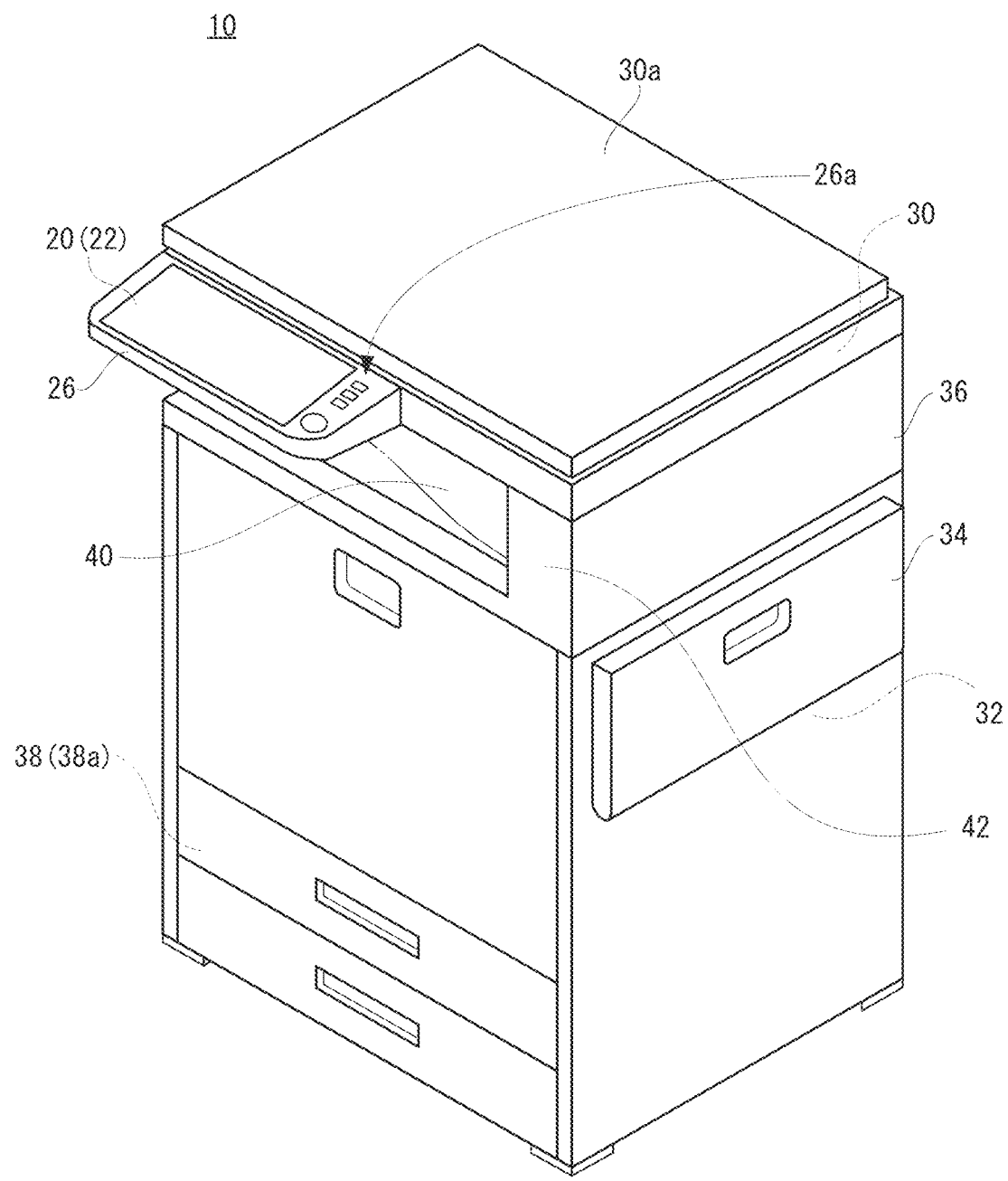
FIG. 1 is a perspective view showing one example of an external configuration of an image forming apparatus according to this embodiment.

FIG. 1 is a perspective view showing an external configuration of an image forming apparatus 10 according to one embodiment of the present invention. With reference to FIG. 1, in this embodiment, the image forming apparatus 10 is a multifunction peripheral (MFP) device that has a copier function (in other words, a copying function), a printer function, a scanner function, and a facsimile function.

It should be noted that the present invention is applicable not only to a multifunction peripheral device but also to another image forming apparatus equipped with at least a copier (or a copying machine).

Further, in the present specification, a front-rear direction (depth direction) of the image forming apparatus 10 and its constituent members is defined by assuming that a surface facing the user operating the image forming apparatus 10, in other words, a surface where an operation panel 26 to be described later is provided is a front surface (front side), and a left-right direction (horizontal direction) of the image forming apparatus 10 and its constituent members is defined based on a state in which the user views the image forming apparatus 10.

The image forming apparatus 10 is provided with an apparatus main body 36 including an image reading unit 30, an image forming unit 32, a manual paper feed unit 34, a paper feed device 38, and a paper discharge tray 40.

The image reading unit 30 includes a document table formed of a transparent member (for example, a contact glass or a platen glass), and is built into the apparatus main body 36. A document pressing cover 30a is openably mounted above the document table via a hinge and the like.

In this embodiment, although the document pressing cover 30a is not provided with a manual document feed unit, a manual document feed unit may be provided. In this case, the document pressing cover 30a is provided with an automatic document feeder (ADF) that automatically feeds a document placed on the manual document feed unit.

In addition, the image reading unit 30 includes a light source, a plurality of mirrors, an imaging lens, a line sensor, and the like. The image reading unit 30 exposes a surface of a document with light from a light source, and guides reflected light reflected from the document surface to the imaging lens by the plurality of mirrors. Then, the reflected light is formed on a light receiving element of the line sensor by the imaging lens. The line sensor detects brightness or chromaticity of the reflected light formed on the light receiving element, and generates read image data based on an image on the document surface. As the line sensor, a charge coupled device (CCD), a contact image sensor (CIS), and the like are used.

The image forming unit 32 is built in the apparatus main body 36, and is provided below the image reading unit 30. The image forming unit 32 includes a photoconductor drum, a charging device, an exposure device, a developing device, a transfer device, a fixing device, and the like. The image forming unit 32 forms an image on an image reading medium (for example, paper) to be transported from the manual paper feed unit (or the paper feed tray) 34 or the paper feed device 38 (or a paper feed cassette 38a) according to an electrophotographic method, and discharges the paper after image formation to the paper discharge tray 40.

However, as output image data for forming an image on paper, read image data read by the image reading unit 30, image data transmitted from an external computer, and the like are used.

Since a process of generating, from read image data, monochromatic or color output image data in which various settings are reflected, and a process of forming a monochromatic or color image according to the output image data are already well known, and are different from an essential content of the present invention, detailed description on these processes is omitted.

Further, although detailed description is omitted, the image forming apparatus 10 has a color printing function, and the image forming unit 32 includes four photoconductor drums, four charging devices, four developing devices, four intermediate transfer rollers, four cleaning devices, and the like for colors of yellow (Y), magenta (M), cyan (C), and black (K). Also, an image forming station including a photoconductor drum, a developing device, a transfer roller, and a cleaning device is constituted for each color. The image forming apparatus 10 is a tandem type image forming apparatus, and the image forming stations for the colors are arranged in a row in the image forming unit 32.

The manual paper feed unit 34 is one example of a paper feeder. Although detailed illustration is omitted, paper of an appropriate size is set in the manual paper feed unit 34. In this embodiment, one manual paper feed unit 34 is shown. Alternatively, a plurality of manual paper feed units 34 may be provided. The paper feed device 38 is one example of a paper feeder similarly to the manual paper feed unit 34. Although detailed illustration is omitted, the paper feed device 38 includes one or more paper feed cassettes 38a. In each of the paper feed cassettes 38a, paper of an appropriate size is set (or accommodated). The paper feed device 38 supplies paper from one of the paper feed cassettes 38a to the image forming unit 32. As described above, an image forming process by the image forming unit 32 is applied to the paper supplied to the image forming unit 32.

However, when an image recording medium is supplied from the manual paper feed unit 34, the manual paper feed unit 34 is used in an open state with respect to the apparatus main body 36, and the image recording medium is set on the manual paper feed unit 34 in the open state.

When the image recording medium is a postcard, the postcard is set in the manual paper feed unit 34 or the paper feed cassette 38a in such a way that a communication side of the postcard faces a predetermined direction (for example, faces downward) so as to print an image on the communication side, and an upper direction on an address side is aligned with a predetermined direction in a horizontal plane (for example, a direction coincident with the rear side of the image forming apparatus 10).

However, the postcard is an image recording medium other than plain paper, and is one example of paper (or printed paper) having an image printed on one surface or paper having a predetermined printing surface. The paper (or printed paper) having an image printed on one surface or the paper having a predetermined printing surface also includes envelopes, paper with holes for binding (such as loose-leaf paper), and the like.

In addition, the image recording medium is not limited to paper, and sheets other than paper, such as clear files and OHP films are also used. Therefore, a clear file is an image recording medium having an image printed on one surface or having a predetermined printing surface.

The paper discharge tray 40 is provided between the image reading unit 30 and the image forming unit 32. A bottom surface of the paper discharge tray 40 is partitioned by the image forming unit 32. A top surface of the paper discharge tray 40 is partitioned by the image reading unit 30. Further, a left surface (left surface when viewed from the front side) of the paper discharge tray 40 is defined by a right surface of a connecting housing 42. In other words, the front side, the back side, and the left side of the paper discharge tray 40 are opened. The bottom surface of the paper discharge tray 40 has an inclined surface that is inclined downward toward the connecting housing 42.

The operation panel 26 is provided on the front side of the image reading unit 30. The operation panel 26 includes a display 22 with a touch panel 20, and a plurality of operation buttons 26a.

The display 22 with the touch panel. 20 displays software keys, messages, preview images, and the like for receiving various settings, printing instructions, or the like from the user. As one example, the display 22 displays a home screen (or a main menu screen), which is a screen for selecting a desired job from among various jobs (or functions) executable by the image forming apparatus 10, and an operation screen such as a setting screen for setting an operating condition of each job. However, in this embodiment, the job means a copy (including document scan) job, a print job, a facsimile transmission job, and the like. In another example, a preview image of a scanned image or a received image, and a screen (hereinafter referred to as "preview screen") for performing settings relating to the preview image are displayed (see FIGS. 4 and 5).

The operation buttons 26a are hardware keys, and include, for example, a home key, a clear key, a power saving key, and a main power key. The home key is a key for displaying the home screen on the display 22. The clear key is a key for clearing an operating condition set by the user, and returning the operating condition to a default state. The power saving key is a key for switching between a power saying state in which power consumption is limited, and a normal state in which power consumption is not limited.

The operation buttons 26a are one example, and at least one of the home key and the clear key may be a software key.

The software key is, for example, a key, button, or an icon reproduced on a display surface of the display 22 with the touch panel 20, as a software. On the other hand, the hardware key is a key or a push button provided as a physical device.

Figure 2:
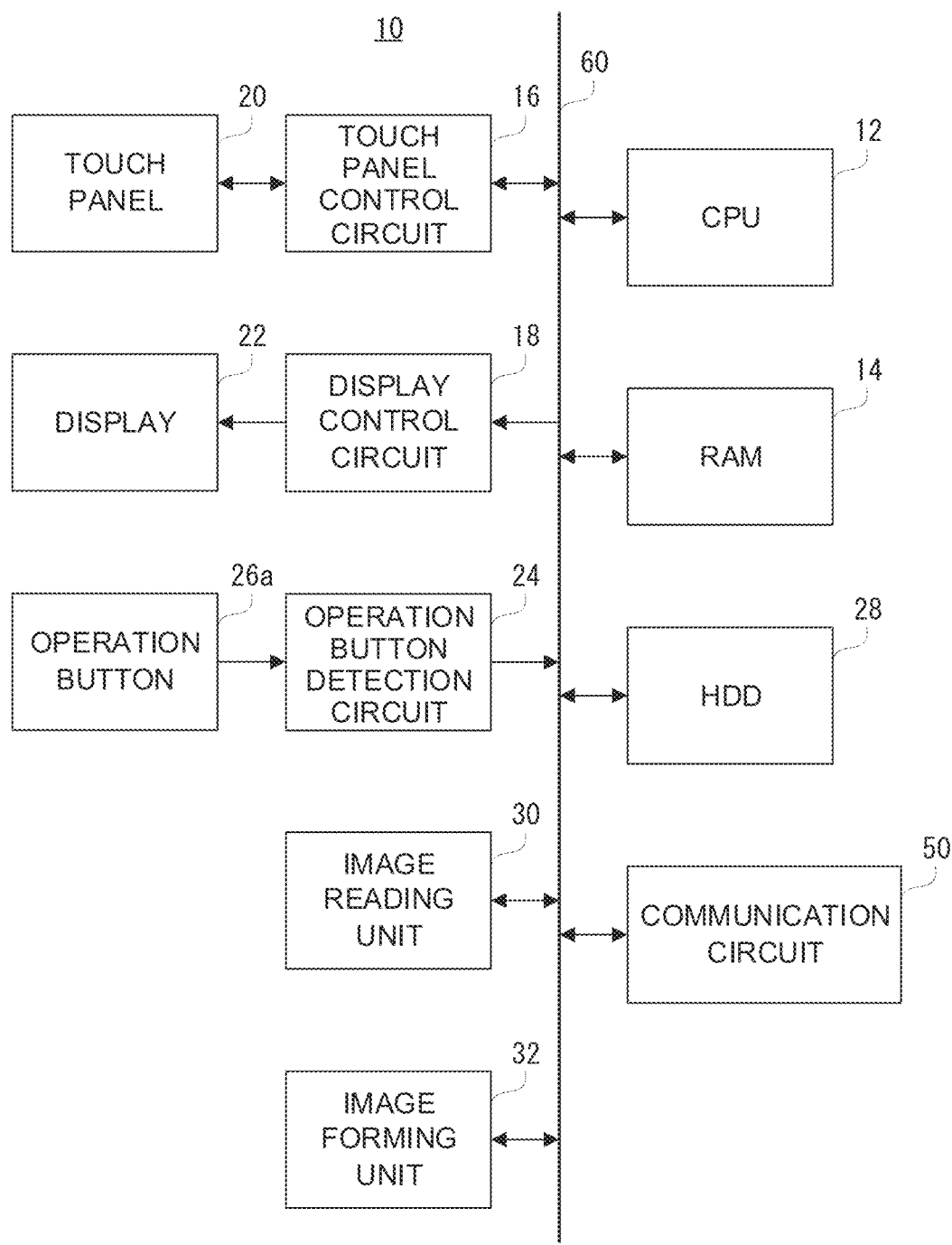
FIG. 2 is a block diagram showing one example of an electrical configuration of the image forming apparatus according to this embodiment.

FIG. 2 is a block diagram showing an electrical configuration of the image forming apparatus 10 shown in FIG. 1. With reference to FIG. 2, the image forming apparatus 10 includes a CPU 12. The CPU 12 is connected to a RAM 14, a touch panel control circuit 16, a display control circuit 18, an operation button detection circuit 24, an HDD 28, the image reading unit 30, the image forming unit 32, and a communication circuit 50 via a bus 60. The touch panel control circuit 16 is connected to the touch panel 20, the display control circuit 18 is connected to the display 22, and the operation button detection circuit 24 is connected to the operation buttons 26a.

The CPU 12 controls overall control of the image forming apparatus 10. The RAM 14 is a main storage device of the image forming apparatus 10, and is used as a work area and a buffer area of the CPU 12.

The touch panel control circuit 16 applies a voltage necessary for the touch panel 20, detects a touch operation or a touch input within a touch effective area of the touch panel 20, and outputs, to the CPU 12, touch coordinate data indicating a position of the touch input.

The touch panel 20 is a general-purpose touch panel, and any method such as a capacitance method, an electromagnetic induction method, a resistance film method, and an infrared method can be used. In this embodiment, a capacitive touch panel is used as the touch panel 20, and the touch panel 20 is provided on a display surface of the display 22. Alternatively, a touch panel display in which the touch panel 20 and the display 22 are integrally formed may be used.

The display control circuit 18 includes a GPU, a VRAM, and the like, and under the instruction of the CPU 12, the GPU generates, in the VRAM, display image data for displaying various screens on the display 22 by using display image generation data 652 (see FIG. 8) stored in the RAM 14, and outputs, to the display 22, the generated display image data. As the display 22, for example, an LCD, an electro-luminescence (EL) display, and the like can be used.

The operation button detection circuit 24 outputs, to the CPU 12, an operation signal or operation data in response to an operation of the operation buttons 26a described above.

The HDD 28 is an auxiliary storage device of the image forming apparatus 10, and stores, as necessary, a control program that causes the CPU 12 to control an operation of each unit of the image forming apparatus 10, display image data for various screens, data about setting contents set in the image forming apparatus 10, data on a document printed by a copying function of the image forming apparatus 10, and the like. Alternatively, another non-volatile memory such as an SSD, a flash memory, and an EEPROM may be used in place of the HDD28 or together with the HDD28.

The communication circuit 50 includes a modem and a network interface card (NIC). The modem is a communication circuit far transmitting and receiving facsimiles, and is connected to a public telephone line. The NIC is a communication circuit for wired or wireless communication with an external computer such as a server or another electronic equipment via a network (LAN or/and an interface), and is connected to an LAN, for example.

The electrical configuration of the image forming apparatus 10 shown in FIG. 2 is merely one example, and the embodiment does not have to be limited to the above. For example, the image forming apparatus 10 may be provided with a connection part such as a memory slot in which various storage devices such as an SD card or a USB memory can be mounted, for example.

In such an image forming apparatus 10, although illustration is omitted, it is possible to select a copying function, a facsimile function, and a scanning function on the home screen. In this embodiment, a case where a copying function is selected is described.

When a copying function is selected, although illustration is omitted, a type of a document and a type of an image recording medium on which an image read from the document is formed (printed) are selected on a paper selection screen. Herein, the type of the document or the type of the image recording medium includes not only the type of paper and the like, but also the size of paper and the like.

Figure 3:
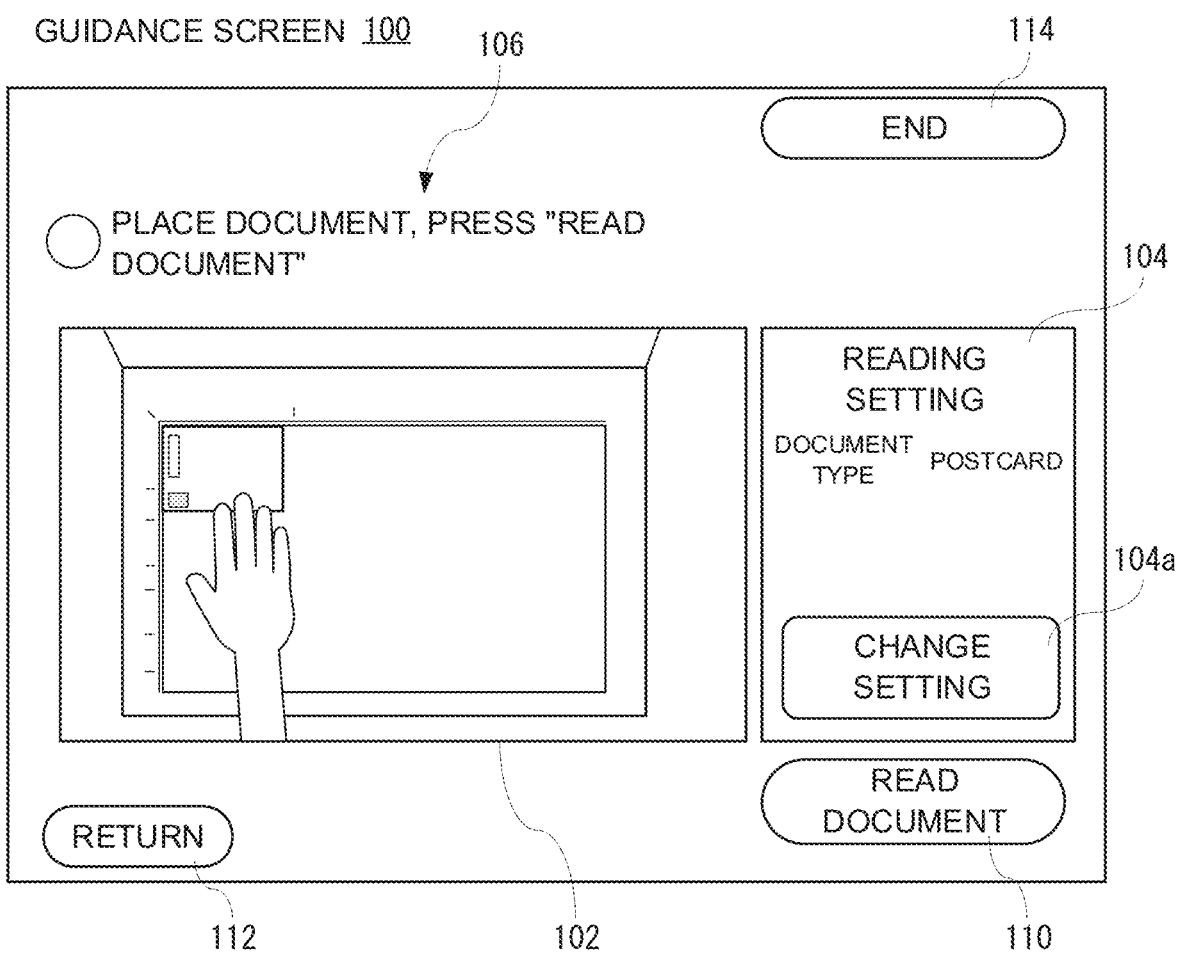
FIG. 3 is a diagram showing one example of a guidance screen to be displayed on a display shown in FIGS. 1 and 2.

In this embodiment, when an image recording medium having an image formed on one surface or a predetermined printing surface is selected, as exemplified by a postcard, a guidance screen 100 as shown in FIG. 3 is displayed on the display 22. However, at least an image of a frame (postal code frame) for describing the postal code of an addressee is printed in advance on the address side of the postcard, and a printing surface is the communication side of the postcard.

In the following, the guidance screen 100 is described. When the guidance screen 100 is described by using directions, up, down, left, and right directions when the guidance screen 100 is viewed from the front side are used. The same is also applied to other screens (200, 300, 400) to be described later.

The guidance screen 100 shown in FIG. 3 includes a display area 102 and a display area 104 in the middle of the screen. A message image 106 is displayed above the display area 102. Further, a button 110 is displayed below the display area 104 and at a lower right corner of the guidance screen 100. Furthermore, a button 112 is displayed below the display area 102 and at a lower left corner of the guidance screen 100. Also, a button 114 is displayed above the display area 104 and at an upper right corner of the guidance screen 100.

The display area 102 is an area for displaying (or reproducing) an image (for example, a moving image) acquired by capturing a state that a document (herein, a postcard) is placed on a document table, when the image forming apparatus 10 performs a process (hereinafter, referred to as "postcard print control process") for printing an image on a postcard.

Alternatively, a plurality of still images acquired by capturing a state that a postcard is placed on a document table according to a procedure may be successively displayed, instead of a moving image. Further alternatively, an animation or a plurality of illustration images may be displayed, in place of an image acquired by capturing a state that a postcard is placed on a document table.

In the example of the guidance screen 100 shown in FIG. 3, an image of a state (or at a point of time) that a document is placed on a document table is displayed.

In addition, as described above, when an ADF is provided, an image of a state that a document is placed on the ADF is also displayed.

Therefore, the user can place a document at a predetermined position on a document table, while viewing an image displayed in the display area 102. At this occasion, the user can place the document at the predetermined position on the document table according to an orientation of the address side indicated by the image displayed in the display area 102.

In the example shown in FIG. 3, the predetermined position is a position at a left end of the document table, and at a rear end of the document table. In other words, the predetermined position is a position at an upper left corner when the user stands in front of the image forming apparatus 10, and looks at the document table from above. The example shown in FIG. 3 indicates that a document is placed in such a way that an upper end of the postcard coincides with the left end of the document table, and a right end of the postcard coincides with the rear end of the document table, when the address side of the postcard faces upward.

The display area 104 is an area for displaying, as reading settings, a type of a document (hereinafter referred to as "document type"), and also displays a button 104a for changing the document type. Although illustration is omitted, when the button 104a is turned on, a screen (hereinafter, referred to as "setting screen") for changing the document type is displayed in front of the guidance screen 100, and the document type is changed according to a user's operation on the setting screen. When the document type is changed, the setting screen is hidden.

The message image 106 is an image in which an explanatory text that briefly explains a procedure of reading a document is written in a text when the postcard print control process is performed. In the example shown in FIG. 3, an explanatory text "Place document, and press 'read document'." is written.

The button 110 is a button for instructing start or execution of document reacting. The button 112 is a button for returning to a previous screen (herein, a paper selection screen). The button 114 is a button for ending the postcard print control process, and returning to the home screen.

A button 212 (see FIGS. 4 and 5) and a button 412 (see FIG. 7), which will be described later, have a similar function to the button 112. Also, a button 214 (see FIGS. 4 and 5), a button 314 (see FIG. 6), and a button 414 (see FIG. 7), which will be described later, have the same function as the button 114. Therefore, in the following, overlapping description on the functions of the buttons 212, 214, 314, 412, and 414 is omitted.

Figure 4:
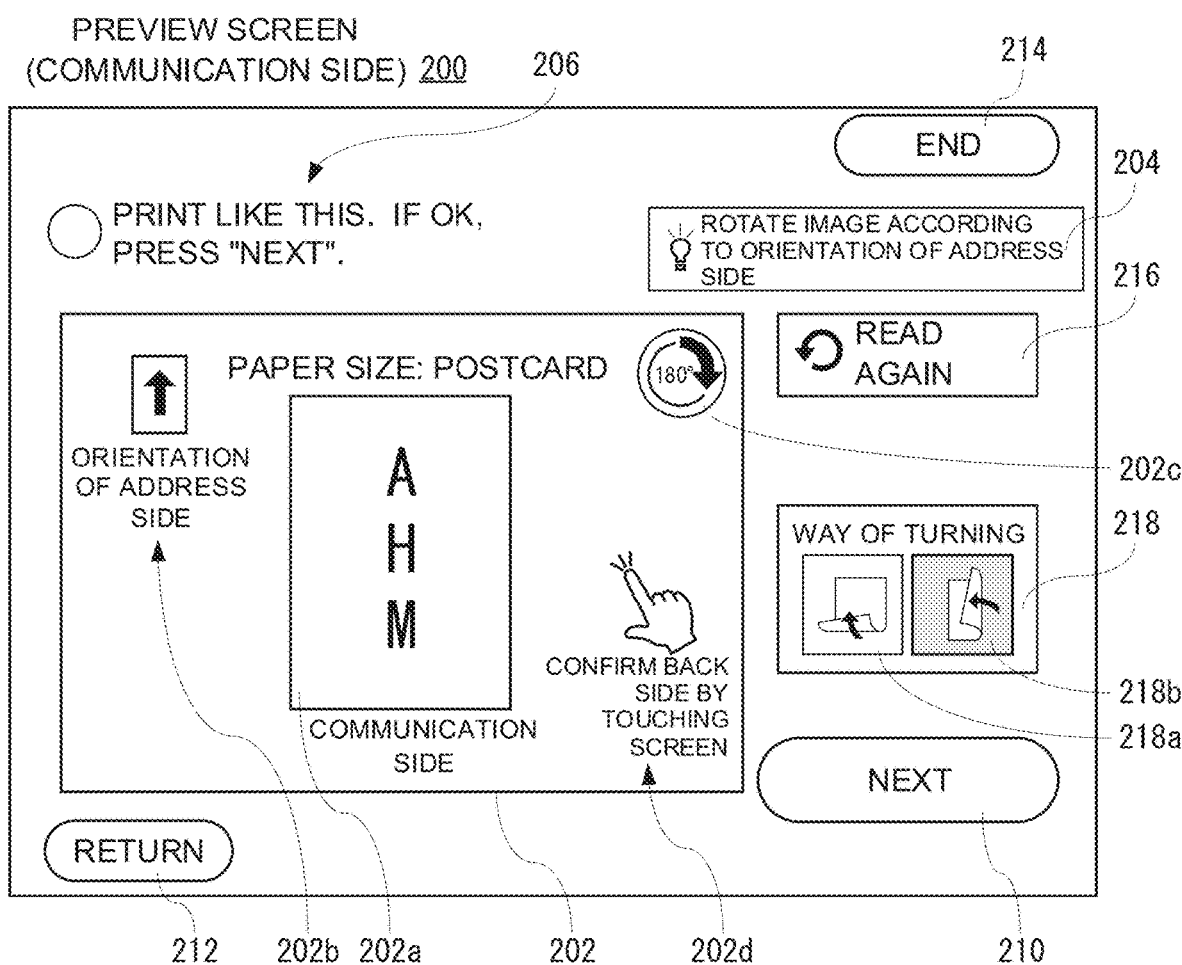
FIG. 4 is a diagram showing one example of a preview screen to be displayed on the display shown in FIGS. 1 and 2.

When document reading is ended, the preview screen 200 is displayed on the display 22, as shown in FIG. 4. The example of the preview screen 200 shown in FIG. 4 includes an image acquired by reading a document, specifically, a preview image 202a on the communication side. In addition, the example of the preview screen 200 shown in FIG. 5 includes a preview image 202a on the address side. In the following, the preview screen 200 is described with reference to FIGS. 4 and 5.

When the preview screen 200 as shown in FIG. 4 is displayed on the display 22, after document reading is ended, and the preview image 202a on the address side is displayed as the preview image 202a on the communication side, the user can recognize that the postcard as the document is placed on the document table in a state that the address side and the communication side are turned upside down. In this case, the user can read the document again. Reading the document again is described later.

The preview screen 200 includes a display area 202 in the middle of the screen. A display area 204 is provided diagonally on the upper right side with respect to the display area 202. Further, a message image 206 is displayed above the display area 202.

In addition, buttons 210, 216, and 218 are displayed on the right side of the display area 202, and are arranged in the order of 216, 218, 210 from the top to the bottom of the screen. Furthermore, the button 212 is displayed below the display area 202 and at a lower left corner of the preview screen 200. Furthermore, the button 214 is displayed above the display area 204 and at an upper right corner of the preview screen 200.

In the display area 202, the preview image 202a, an instruction image 202b, a button 202c, an instruction image 202d, and the like are displayed.

Figure 5:
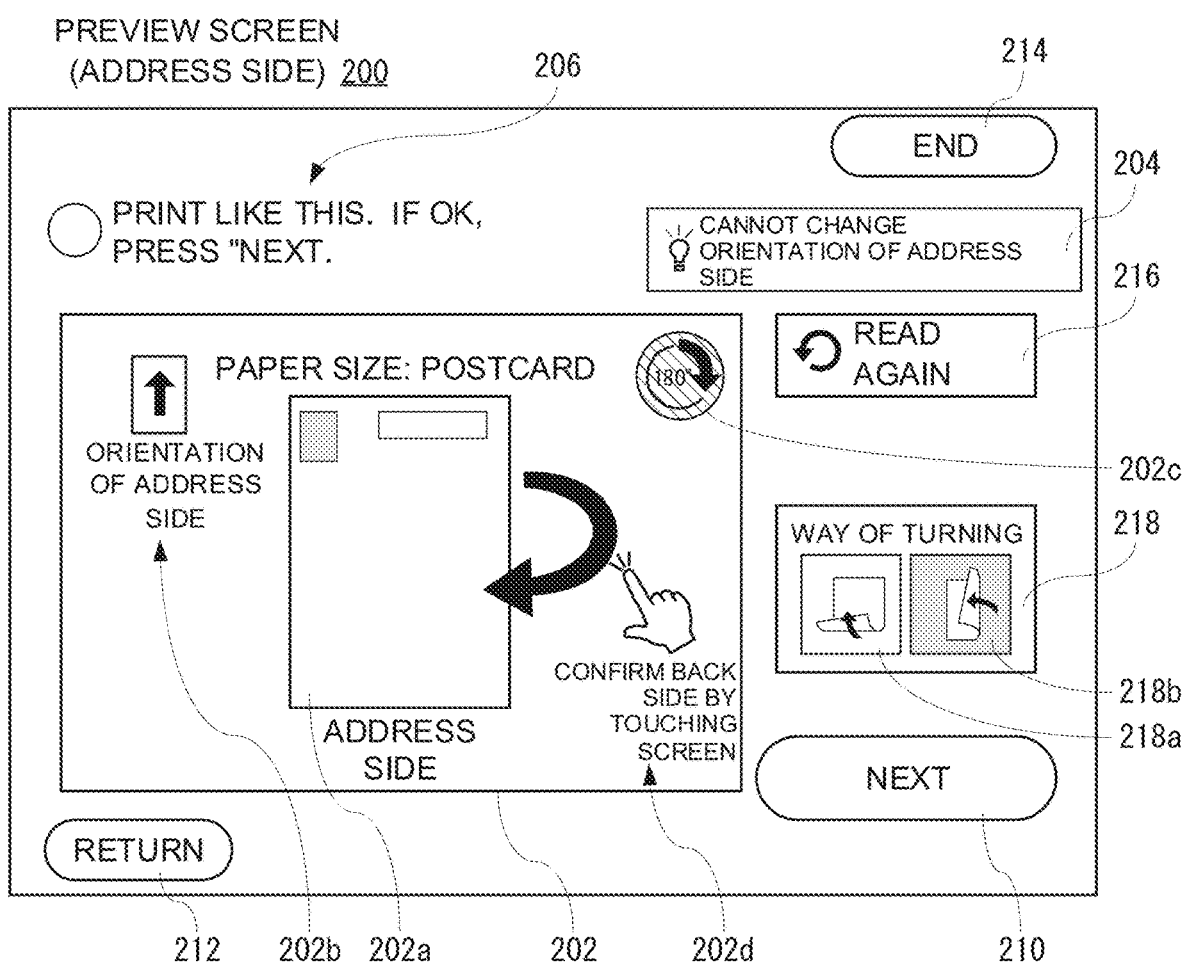
FIG. 5 is a diagram showing another example of the preview screen to be displayed on the display shown in FIGS. 1 and 2.

In this embodiment, the preview image 202a is displayed in the middle of the display area 202. As described above, the preview image 202a shown in FIG. 4 is an image acquired by reading a document, and the preview image 202a shown in FIG. 5 is an image about the address side. In this embodiment, the preview image 202a about the address side is a still image acquired by capturing the address side of a postcard or an illustration image depicting the address side.

An image (text image) in which a character string indicating the address side or the communication side is written in a text is displayed below the preview image 202a. In FIG. 4, a text image is described as "communication side", and in FIG. 5, a text image is described "address side".

In addition, in FIG. 5, by indicating an arrow image in which a part of an arrow overlaps the preview image 202a, it is expressed that the postcard as the preview image 202a is turned over. However, the arrow image is not actually displayed. Alternatively, the arrow image may actually be displayed.

In addition, the instruction image 202b is displayed diagonally on the upper left side with respect to the preview image 202a and at an upper left corner of the display area 202. The instruction image 202b includes an arrow image and a text image. The arrow image is an image in which an arrow indicating an orientation of the address side on the preview screen 200 is described. However, the orientation of the arrow indicates an orientation in which an upper end of the address side on the preview screen 200 is located. The text image is an image in which a character string indicating that the arrow of the arrow image indicates an orientation of the address side on the preview screen 200 is written in a text. In the examples shown in FIGS. 4 and 5, a text image is described as "orientation of the address side".

Further, the button 202c is displayed diagonally on the upper right side with respect to the preview image 202a and at an upper right corner of the display area 202. The button 202c is a button for rotating the preview image 202a to the right (or to the left) by a predetermined angle (180 degrees in this embodiment) with respect to a line passing through a center point of the preview image 202a and extending perpendicular to the display area 202 (or a display surface of the display 22), as an axis of rotation. In other words, when the button 202c is turned on, the preview image 202a is rotated in the plane of the preview screen 200. Therefore, although illustration is omitted, the preview image 202a is turned upside down. In other words, the orientation of the preview image 202a is changed.

When the preview image 202a is rotated by 180 degrees, an image to be printed on an image recording medium (in other words, an output image) is also rotated by 180 degrees in the same direction. However, as will be described later, the preview image 202a is displayed based on data of an output image ("communication side output image data 658" to be described later, see FIG. 8) to be printed on an image recording medium (see FIG. 8).

Therefore, when the orientation of an image on the communication side from which a document is read does not coincide with the orientation of the address side, or when the orientation does not coincide with the orientation intended by the user, the user can change the orientation of the read image on the communication side. In other words, the user can print the read image on the communication side in an orientation that coincides with the orientation of the address side or in an orientation intended by the user.

In this embodiment, when the button 202c is turned on, the preview image 202a is rotated by 180 degrees. However, the embodiment does not have to be limited to the above. The predetermined angle may be 90 degrees. The angle may be an angle optionally set by the user.

Also, when the preview image 202a on the address side shown in FIG. 5 is displayed, the button 202c is grayed out, and the preview image 202a on the address side cannot be rotated in the plane of the preview screen 200. This is because the orientation of a postcard set in the manual paper feed unit 34 or the paper feed cassette 38a is determined in advance. FIG. 5 shows that the button 202c is grayed out by adding a diagonal line to the button 202c.

In this embodiment, when the preview image 202a on the address side is displayed, the button 202c is grayed out. However, the embodiment does not have to be limited to the above. In another embodiment, the button 202c may be hidden. Also, even when the button 202c is turned on in a state that the button 202c is displayed, the preview image 202a on the address side may be kept from being rotated.

However, the preview image 202a on the address side may also be rotatable. In this case, when an image is printed on the communication side of the postcard, a process is performed in such a way that the orientation of the address side as the preview image 202a, and the orientation of the address side of the postcard set in the manual paper feed unit 34 or the paper feed cassette 38a coincide with each other.

Further, the instruction image 202d is displayed diagonally on the lower right side with respect to the preview image 202a and at a lower right corner of the display area 202. The instruction image 202d includes a right-hand image and a text image. The right-hand image is an image of a right hand indicating touching a screen. The text image is an image in which a character string indicating that the image on the back side of the preview image 202a can be confirmed by touching the screen is written in a text. In the examples shown in FIGS. 4 and 5, a text image is described as "Confirm the back side by touching the screen".

The display area 204 is an area for displaying, in a text, a hint or an advice relating to an operation on the preview screen 200. In the example shown in FIG. 4, it is notified that an image acquired by reading a document, specifically, the preview image 202a is rotated according to the orientation of the address side. In the example shown in FIG. 4, "Rotate image according to orientation of address side." is written.

However, as described above, since the address side cannot be rotated, in the example shown in FIG. 5, it is notified that rotation is not available. In the example shown in FIG. 5, "Cannot change orientation of address side." is written.

The message image 206 is an image in which an explanatory text that briefly explains a procedure for setting the number of copies to be printed and proceeding to a screen ("print start screen 400" to be described later) on which start or execution of the printing process is instructed is written in a text. In the examples shown in FIGS. 4 and 5, an explanatory text "Print like this. If OK, press 'Next'." is written.

In this embodiment, when any position on the display area 202 excluding the area where the button 202c, is displayed is touched, the operation screen is changed to a screen displaying the preview image 202a about the back side of a currently displayed surface. It should be noted that when the preview image 202a on the address side is currently displayed, the back side is the communication side, and when the preview image 202a on the communication side is currently displayed, the back side is the address side.

Also, when the preview image 202a on the back side is displayed, the orientation in which the preview image 202a on the back side is displayed differs depending on a way of turning set by the button 218.

The button 218 is provided to set a way of turning a postcard when printing is performed. There are two ways of turning, namely, vertical turning and horizontal turning. The vertical turning is a way of turning paper over in such a way that upper and lower sides of the paper are reversed. The horizontal turning is a way of turning paper over in such a way that left and right sides of the paper are reversed.

An image 218a indicating vertical turning, and an image 218b indicating horizontal turning are displayed on the button 218. In the examples shown in FIGS. 4 and 5, horizontal turning is set. In addition, in FIGS. 4 and 5, the background of the image 218b is shown in gray to indicate that horizontal turning is set. However, this is merely one example. A method of expressing that vertical turning or horizontal turning is set should not be limited. For example, brightness of the image 218a or 218b indicating a set way of turning may be changed. Also, the image 218a or 218b for which a way of turning is not set may be grayed out. It is also possible to display only the image 218a or 218b for which a way of turning is set.

Therefore, in the preview screen 200 shown in FIG. 4, when any position on the display area 202 excluding the area where the button 202c is displayed is touched, the preview image 202a is changed by assuming that the postcard when printing is turned horizontally, and the preview screen 200 as shown in FIG. 5 is displayed (or updated). In other words, the preview image 202a on the address side is displayed, and the preview image 202a on the communication side is hidden.

On the other hand, in the preview screen 200 shown in FIG. 5, when any position on the display area 202 excluding the area where the button 202c is displayed is touched, the preview image 202a is changed by assuming that the postcard when printing is turned horizontally, and the preview screen 200 as shown in FIG. 4 is displayed (or updated). In other words, the preview image 202a on the communication side is displayed, and the preview image 202a on the address side is hidden.

Although illustration is omitted, when vertical turning is set, the vertical orientation is reversed with respect to the currently displayed preview image 202a when the preview image 202a on the back side is displayed. Also, when vertical turning is set, the orientation of the arrow indicated by the arrow image of the instruction image 202b is set downward when the preview image 202a on the communication side is displayed.

By displaying the preview image 202a on the preview screen 200 as described above, it is possible to know a relationship between the orientation of an image to be printed on a printing surface (communication side in the case of a postcard), and the orientation of an image printed surface or a non-printing surface (address side in the case of a postcard) before a printing process is performed. In this embodiment, the relationship means whether the orientation of an image to be printed on a printing surface, and the orientation of an image printed surface or a non-printing surface coincide with each other, or whether they are as intended by the user.

Also, when the orientation of an image to be printed on a printing surface, specifically, a read image, and the orientation of an image printed surface or a non-printing surface do not coincide with each other, or when they are not as intended by the user, the user can change the orientation of the read image before performing a printing process. Thus, the user can obtain a desired printing result.

The button 216 is provided for selecting to read the document again. When the button 216 is turned on, the confirmation screen 300 shown in FIG. 6 is displayed in front of the preview screen 200.

The confirmation screen 300 is a screen in which the user confirms whether to determine reading the document again, or stop reading the document again, and capable of selecting either one.

Figure 6:
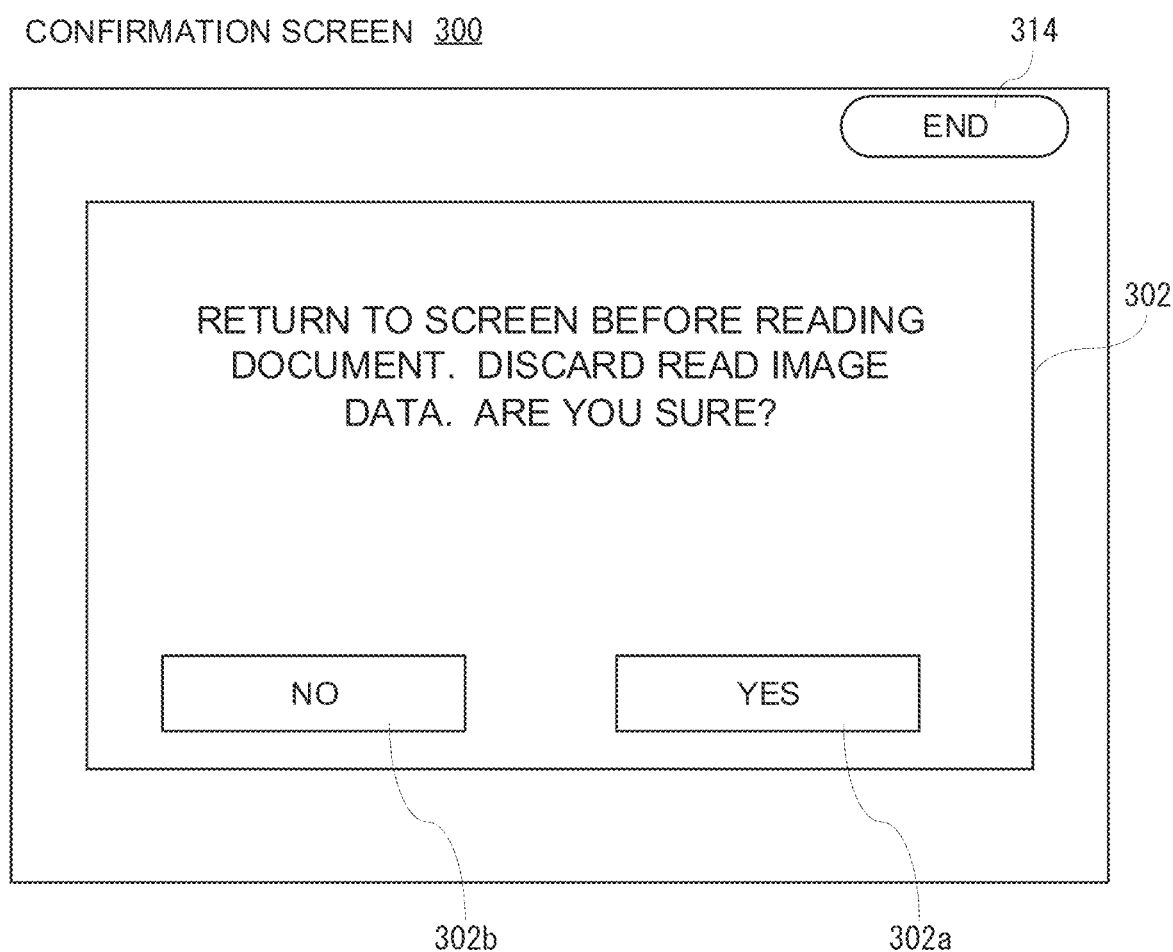
FIG. 6 is a diagram showing one example of a confirmation screen to be displayed on the display shown in FIGS. 1 and 2.

As shown in FIG. 6, the confirmation screen 300 includes a display area 302 in the middle of the screen. In the upper half of the display area 302, a message image for confirming that reading the document again is displayed. In the example shown in FIG. 6, a confirmation content "Return to screen before reading the document. Discard read image data. Are you sure?" is described.

In addition, a button 302a and a button 302b are displayed side by side at a lower end of the display area 302. Furthermore, the button 314 is displayed above the display area 302 and at an upper right corner of the confirmation screen 300, The button 302a is provided to determine reading the document again. The button 302b is provided to stop reading the document again.

Figure 8:
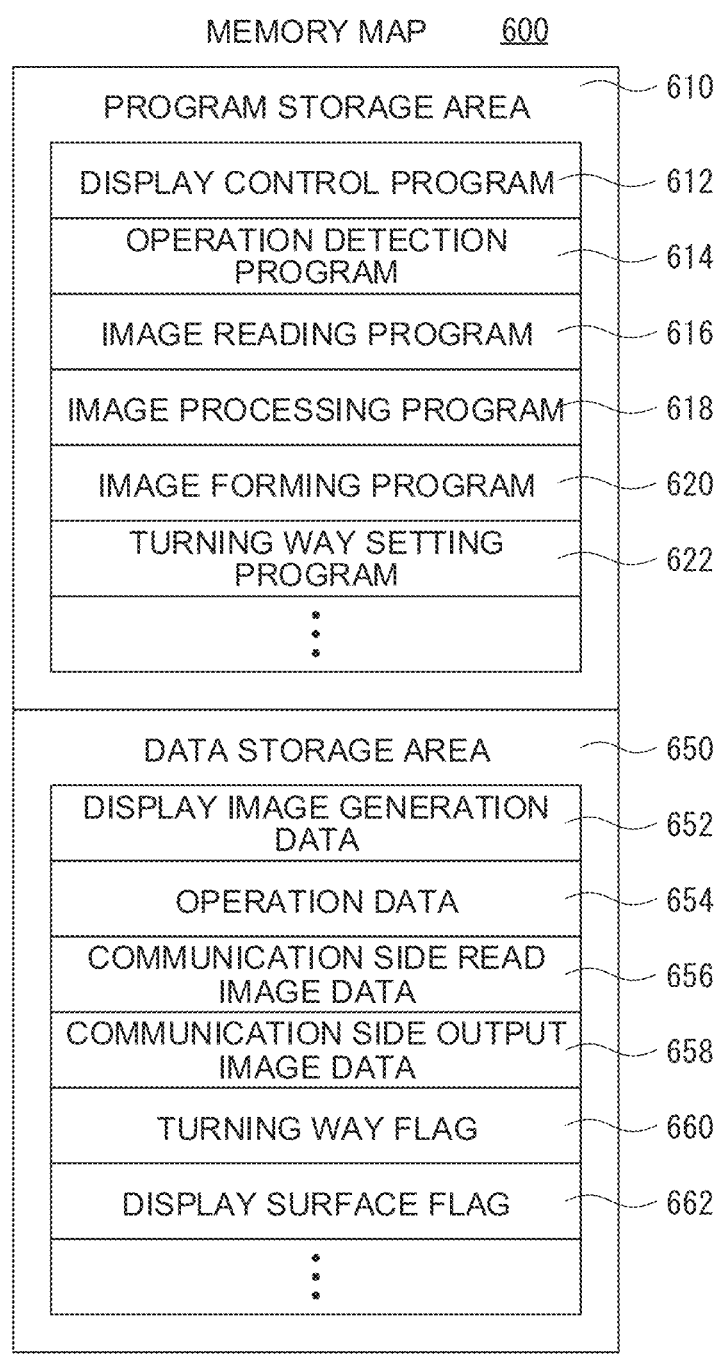
FIG. 8 is a diagram showing one example of a memory map of an RAM shown in FIG. 2.

When the button 302a is turned on, image data associated with a previously read document image (in this embodiment, "communication side read image data 656", see FIG. 8) are discarded (or deleted), the preview screen 200 and the confirmation screen 300 are hidden, and the guidance screen 100 shown in FIG. 3 is displayed. Therefore, the user can read the document again. When the button 302b is turned on, reading the document again is stopped, and the confirmation screen 300 is hidden. Therefore, the display 22 returns to the state that the preview screen 200 is displayed, as shown in FIG. 4 or FIG. 5.

Figure 7:
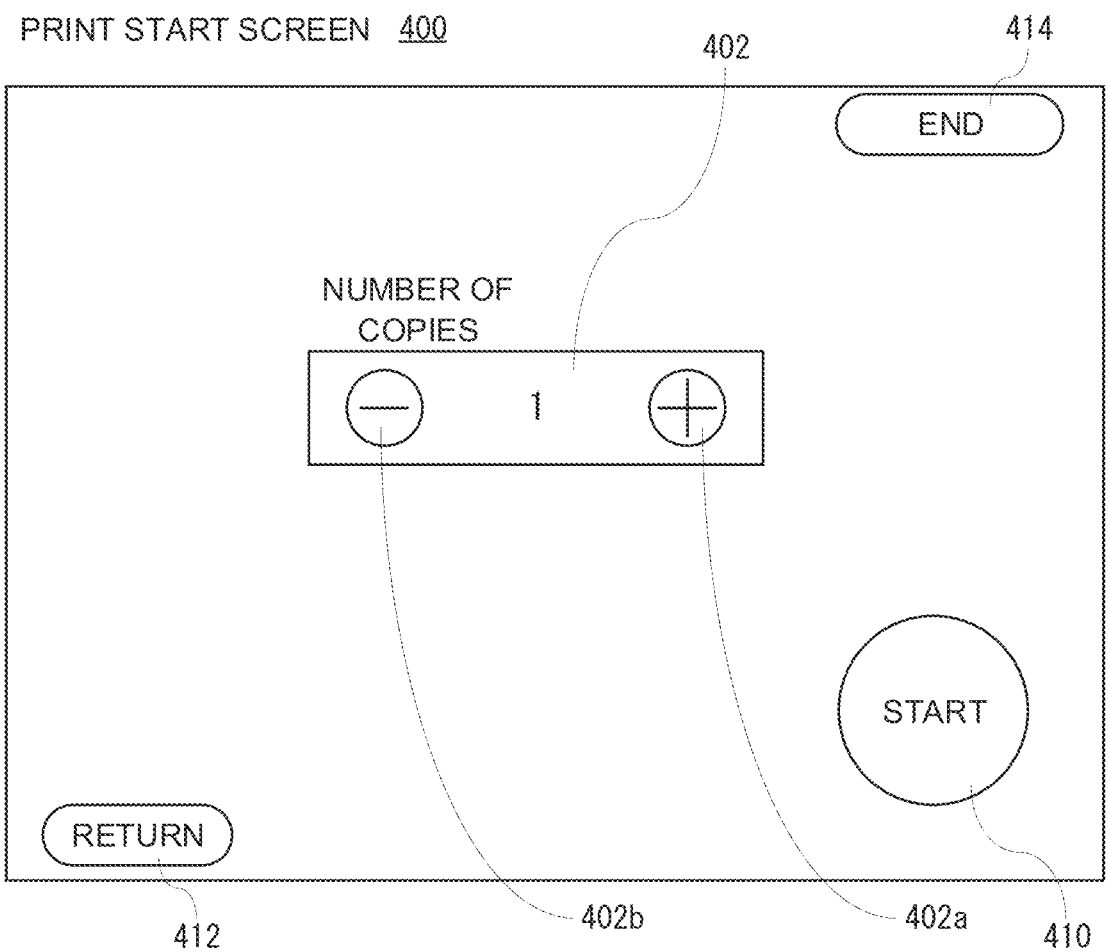
FIG. 7 is a diagram showing one example of a print start screen to be displayed on the display shown in FIGS. 1 and 2.

Referring back to FIGS. 4 and 5, when the button 210 is turned on, the print start screen 400 as shown in FIG. 7 is displayed on the display 22. The print start screen 400 is a screen for setting or changing the number of copies to be printed, and instructing to start printing, and the like.

As shown in FIG. 7, the print start screen 400 includes a display area 402 in the middle of the screen. The button 410 is displayed at a lower right corner, the button 412 is displayed at a lower left corner, and the button 414 is displayed at an upper right corner on the print start screen 400.

The display area 402 displays the number of copies to be printed, and also displays a button 402a and a button 402b for setting or changing the number of copies to be printed. The button 402a is a button for increasing the number of copies to be printed. The button 402b is a button for decreasing the number of copies to be printed. For example, each time the button 402a is turned on, the number of copies to be printed is increased by 1. On the other hand, each time the button 402b is turned on, the number of copies to be printed is decreased by 1. However, the number of copies to be printed is not increased beyond a maximum value (for example, 1000), and is not decreased beyond a minimum value (1).

The number of copies to be printed may be input numerically by displaying numeric keys on the print start screen 400 or by providing numeric keys as the operation buttons 26a.

The button 410 is a button for instructing to start (or execute) printing. When the button 410 is turned on, the image forming unit 32 performs a printing process of printing, on a communication side of a postcard, an image read from a document in an orientation determined on the preview screen 200 by the number of copies to be printed, which is set on the print start screen 400.

FIG. 8 shows one example of a memory map 600 of the RAM 14 shown in FIG. 2. As shown in the memory map 600 of FIG. 8, the RAM 14 has a program storage area 610 and a data storage area 650. A control program for the image forming apparatus 10 is stored in the program storage area 610 of these areas. Specifically, the control program includes a display control program 612, an operation detection program 614, an image reading program 616, an image processing program 618, an image forming program 620, a turning way setting program 622, and the like.

The display control program 612 is a program for generating display screen data necessary for displaying, on the display 22, various screens such as the guidance screen 100, the preview screen 200, the confirmation screen 300, and the print start screen 400. The operation detection program 614 is a program for detecting an operation state of the touch panel 20 and the operation buttons 26a.

The image reading program 616 is a program for controlling the image reading unit 30. The image processing program 618 is a program for applying appropriate image processing to various image data such as read image data generated by the image reading unit 30.

The image forming program 620 is a program for controlling the image forming unit 32, The turning way setting program 622 is a program for setting (or changing) a way of turning a postcard when printing is performed according to a user's operation.

Although illustration is omitted, the program storage area 610 also stores another program such as a communication program for communicating with another computer and the like.

Various types of data are stored in the data storage area 650. The various types of data include the display image generation data 652, operation data 654, the communication side read image data 656, the communication side output image data 658, a turning way flag 660, a display surface flag 662, and the like.

The display image generation data 652 are image data for use in generating display screen data according to the display control program 612. In this embodiment, the display image generation data 652 include image data associated with an image on the address side of a postcard. The operation data 654 are data representing an operation state with respect to the touch panel 20 or/and data representing an operation state of the operation buttons 26a. The data representing the operation state with respect to the touch panel 20 are data representing a touch position (coordinate) of the user with respect to the touch panel 20. The data representing the operation state of the operation buttons 26a are data indicating pressing the operation buttons 26a by the user. These pieces of data are stored in chronological order.

The communication side read image data 656 are image data about a communication side of a document that is read by the image reacting unit 30 and subjected to predetermined image processing. The communication side output image data 658 are data of an image to be formed on a communication side of a postcard. The preview image 202a (or the preview screen 200) on the communication side is formed by using the communication side output image data 658.

The turning way flag 660 is a flag for determining a way of turning a postcard when printing is performed, and is constituted of 1-bit data. When vertical turning is set as a way of turning, the turning way flag 660 is turned on, and when horizontal turning is set as a way of turning, the turning way flag 660 is turned off.

The display surface flag 662 is a flag for determining whether the preview image 202a on the communication side is displayed or the preview image 202a on the address side is displayed when the preview screen 200 is displayed, and is constituted of 1-bit data. When the preview image 202a on the address side is displayed, the display surface flag 662 is turned on, and when the preview image 202a on the communication side is displayed, the display surface flag 662 is turned off.

Although illustration is omitted, the data storage area 650 stores other data and other flags necessary for executing the control program, and also stores a counter (or a timer) necessary for executing the control program.

Figure 9:
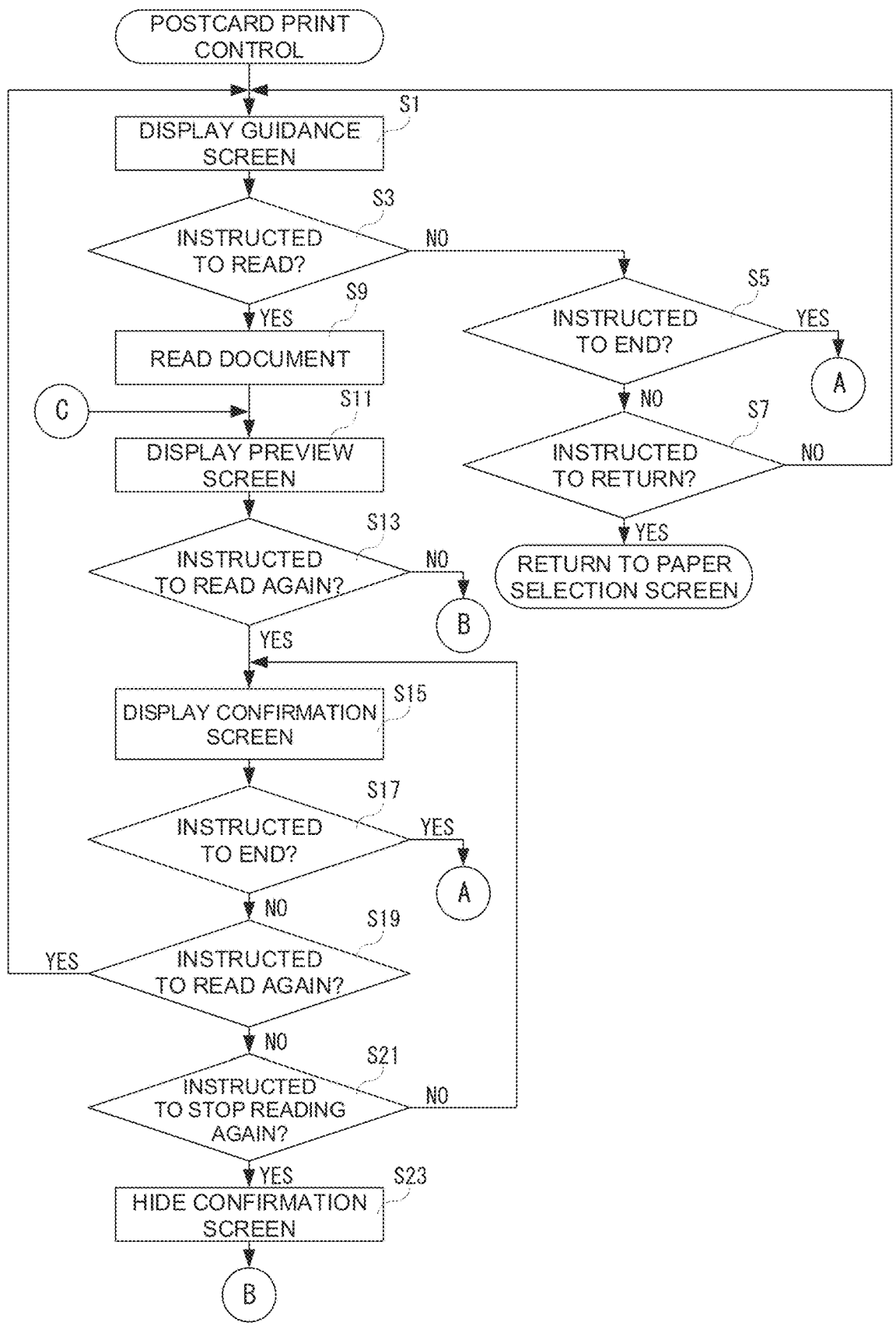
FIG. 9 is a flowchart showing a part of one example of a postcard print control process of a CPU shown in FIG. 2.
Figure 10:
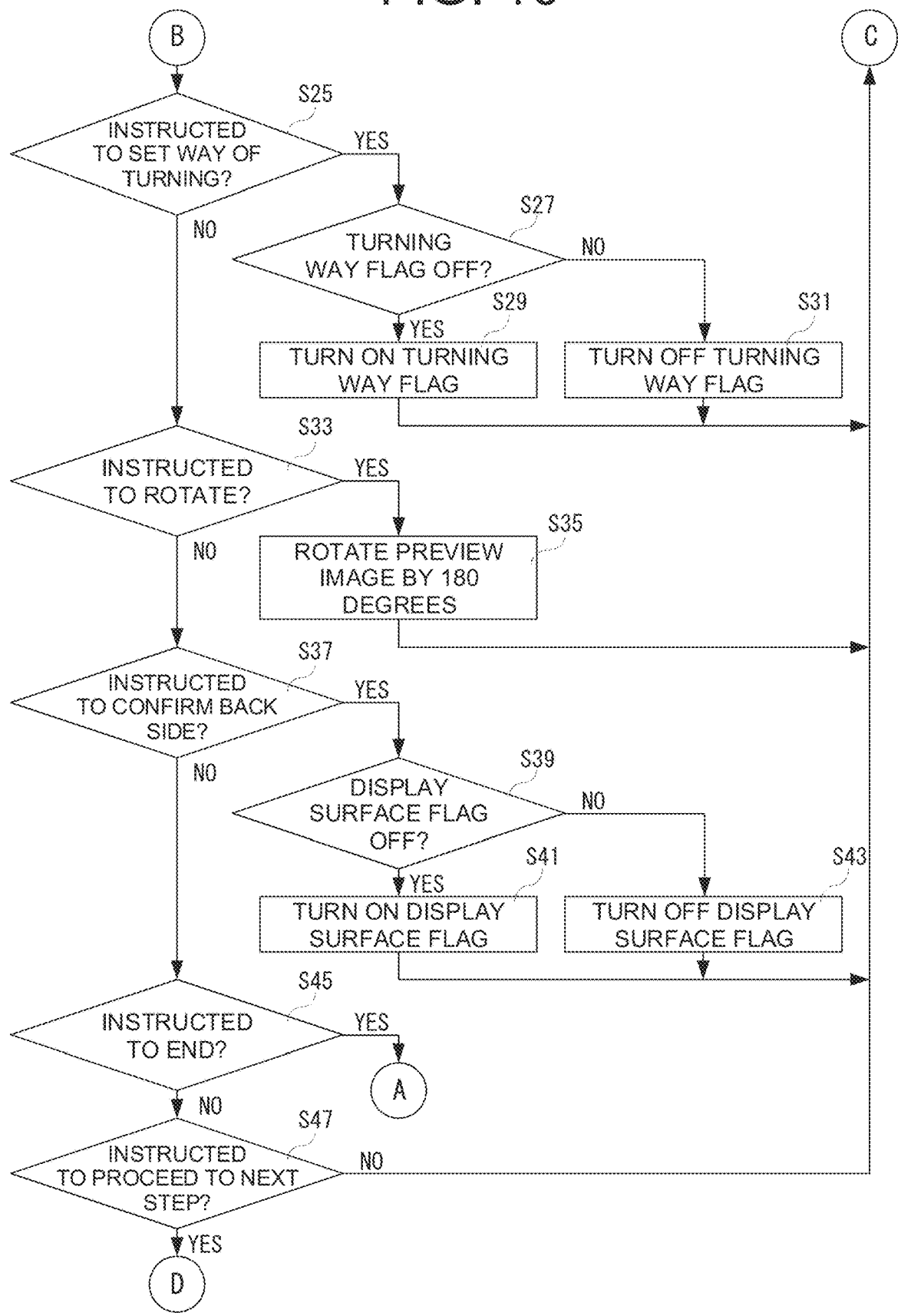
FIG. 10 is the flowchart following FIG. 9 and showing another part of the postcard print control process of the CPU shown in FIG. 2.
Figure 11:
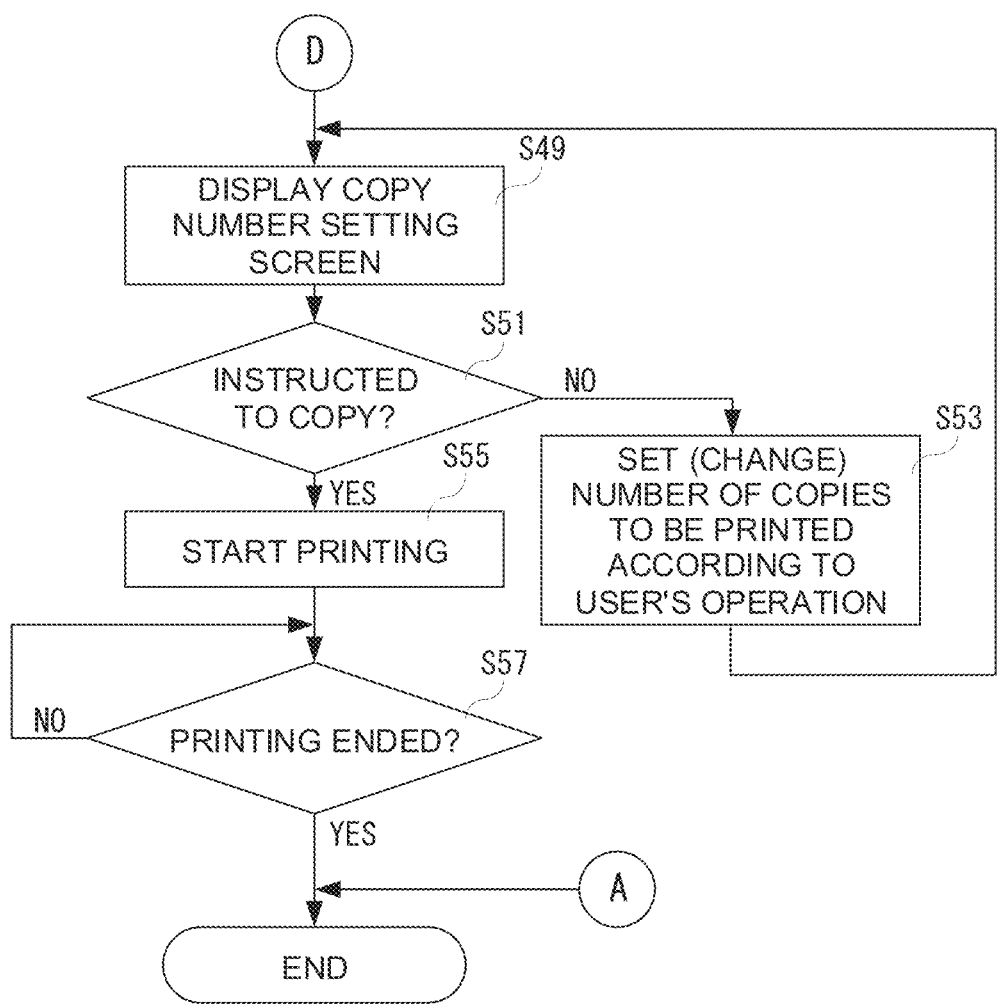
FIG. 11 is the flowchart following FIGS. 9 and 10 and showing another part of the postcard print control process of the CPU shown in FIG. 2.

FIGS. 9 to 11 are a flowchart showing one example of the postcard print control process of the CPU 12 shown in FIG. 2. When the user selects a postcard as a paper size on the paper selection screen, the CPU 12 starts the postcard print control process, and causes the display 22 to display the guidance screen 100 as shown in FIG. 3 in step S1. Therefore, the user learns a way of placing a document on the document table, while viewing an image displayed in the display area 102 of the guidance screen 100.

Although illustration is omitted, the turning way flag 660 and the display surface flag 662 are turned off at the beginning when the postcard print control process is started.

In step S3 that follows, it is determined whether there is a read instruction. Herein, the CPU 12 refers to the operation data 654, and determines whether the button 110 is turned on. If step S3 is "NO", in other words, if there is no read instruction, in step S5, it is determined whether there is an end instruction. Herein, the CPU 12 refers to the operation data 654, and determines whether the button 114 is turned on.

If step S5 is "YES", in other words, if there is an end instruction, the postcard print control process is ended, as shown in FIG. 11. Although illustration is omitted, in this case, the operation screen returns to the main menu screen. On the other hand, if step S5 is "NO", in other words, if there is no end instruction, in step S7, it is determined whether there is a return instruction. Herein, the CPU 12 refers to the operation data 654, and determines whether the button 112 is turned on.

If step S7 is "NO", in other words, if there is no return instruction, the process returns to step S1. On the other hand, if step S7 is "YES", in other words, if there is a return instruction, the postcard print control process is interrupted, and the operation screen returns to the paper selection screen.

If step S3 is "YES", in other words, if there is a read instruction, the document is read in step S9. In other words, the CPU 12 instructs the image reading unit 30 to perform an image reading process. Thus, the image reading unit 30 performs an image reading process for reading an image of the document (in this embodiment, the communication side of the postcard). Thus, the communication side read image data 656 are stored in the data storage area 650.

In step S11 that follows, the preview screen 200 on the communication side as shown in FIG. 4 is displayed on the display 22. At this occasion, the image of the document read in step S9 is displayed in the display area 202 as the preview image 202*a*. The preview image 202*a* is an image based on the communication side output image data 658, and the communication side output image data 658 are generated from the communication side read image data 656. Also, the background of the image 218*a* or the image 218*b* is grayed out based on the turning way flag 660, and the preview image 202*a* on the address side or the communication side is displayed based on the display surface flag 662.

Next, in step S13, it is determined whether there is an instruction to read again. Herein, the CPU 12 refers to the operation data 654, and determines whether the button 216 is turned on.

If step S13 is "NO", in other words, if there is no instruction to read again, the process proceeds to step S25 shown in FIG. 10. On the other hand, if step S13 is "YES", in other words, if there is an instruction to read again, in step S15, the display 22 is caused to display the confirmation screen 300 as shown in FIG. 6. However, the confirmation screen 300 is displayed in front of the preview screen 200.

In step S17 that follows, it is determined whether there is an end instruction. Herein, the CPU 12 refers to the operation data 654, and determines whether the button 314 is turned on.

If step S17 is "YES", in other words, if there is an end instruction, the postcard print control process is ended. On the other hand, if step S17 is "NO", in other words, if there is no end instruction, in step S19, it is determined whether there is an instruction to read again. Herein, the CPU12 refers to the operation data 654, and determines whether the button 302*a* is turned on.

If "YES" in step S19, in other words, if there is an instruction to read again, the communication side read image data 656 are deleted, and the process returns to step S1. On the other hand, if step S19 is "NO", in other words, if there is no instruction to read again, in step S21, it is determined whether there is an instruction to stop reading again. Herein, the CPU 12 refers to the operation data 654, and determines whether the button 302*b* is turned on.

If step S21 is "NO", in other words, if there is no instruction to stop reading again, the process returns to step S15. On the other hand, if step S21 is "YES", in other words, if there is an instruction to stop reading again, in step S23, the confirmation screen 300 is hidden, and the process proceeds to step S25. Therefore, by the process of step S23, the operation screen returns to the preview screen 200.

As shown in FIG. 10, in step S25, it is determined whether there is an instruction to set a way of turning. Herein, the CPU 12 refers to the operation data 654, and determines whether the button 218 is turned on (or touched).

If step S25 is "YES", in other words, if there is an instruction to set a way of turning, in step S27, it is determined whether the turning way flag 660 is in an off-state. If step S27 is "YES", in other words, if the turning way flag 660 is in an off-state, in step S29, the turning way flag 660 is turned on, and the process returns to step S11 shown in FIG. 9. On the other hand, if step S27 is "NO", in other words, if the turning way flag 660 is in an on-state, the turning way flag 660 is turned off, and the process returns to step S11.

Also, if step S25 is "NO", in other words, if there is no instruction to set a way of turning, in step S33, it is determined whether there is an instruction to rotate. Herein, the CPU 12 refers to the operation data 654, and determines whether the button 202*c* is turned on (or touched). However, when the button 202*c* is in an inoperable state, the CPU12 determines "NO" in step S33, even when the button 202*c* is touched.

If step S33 is "YES", in other words, if there is an instruction to rotate, in step S35, the preview image 202*a* is rotated by 180 degrees, and the process returns to step S11. In step S35, the CPU12 rotates the communication side output image data 658 by 180 degrees to the right. As a result, the preview image 202*a* is rotated by 180 degrees.

On the other hand, if step S33 is "NO", in other words, if there is no instruction to rotate, in step S37, it is determined whether there is an instruction to confirm the back side. Herein, the CPU 12 refers to the operation data 654, and determines whether a part or a position on the display area 202 other than the display area of the button 202*c* is touched.

If step S37 is "YES", in other words, if there is an instruction to confirm the back side, in step S39, it is determined whether the display surface flag 662 is in an off-state. If step S39 is "YES", in other words, if the display surface flag 662 is in an off-state, in step S41, the display surface flag 662 is turned on, and the process returns to step S11. On the other hand, if step S39 is "NO", in other words, if the display surface flag 662 is in an on-state, in step S43, the display surface flag 662 is turned off, and the process returns to step S11.

Also, if step S37 is "NO", in other words, if there is no instruction to confirm the back side, in step S45, it is determined whether there is an end instruction. Herein, the CPU 12 refers to the operation data 654, and determines whether the button 214 is turned on.

If step S45 is "YES", in other words, if there is an end instruction, the postcard print control process is ended. On the other hand, if step S45 is "NO", in other words, if there is no end instruction, in step S47, it is determined whether there is an instruction to proceed to a next step. Herein, the CPU12 refers to the operation data 654, and determines whether the button 210 is turned on.

If step S47 is "NO", in other words, if there is no instruction to proceed to a next step, the process returns to step S11. On the other hand, if step S47 is "YES", in other words, if there is an instruction to proceed to a next step, in step S49 shown in FIG. 11, the display 22 is caused to display the print start screen 400 as shown in FIG. 7.

In step S51 that follows, it is determined whether there is an instruction to copy. Herein, the CPU 12 refers to the operation data 654, and determines whether the button 410 is turned on.

If step S51 is "NO", in other words, if there is no instruction to copy, in step S53, as described above, the number of copies to be printed is set (or changed) according to a user's operation, and the process returns to step S49. However, when the number of copies to be printed is not set (or changed), the CPU 12 returns to step S49 without performing the process of step S53.

On the other hand, if step S51 is "YES", in other words, if there is an instruction to copy, printing is started in step S55. In step S55, the CPU 12 controls the image forming unit 32 to print, on the communication side of an image recording medium (herein, a postcard), an image associated with the communication side output image data 658 by the number of copies to be printed, which is set on the print start screen 400.

Next, in step S57, it is determined whether printing is ended. If step S57 is "NO", in other words, if printing is not ended, the process returns to step S57. On the other hand, if step S57 is "YES", in other words, if printing is ended, the postcard print control process is ended.

According to this embodiment, when an image is printed on the other surface or a printing surface (a communication side in the case of a postcard) of an image recording medium having an image printed on one surface (an address side in the case of a postcard) or a predetermined printing surface, as exemplified by a postcard, by previewing and rotating a read image as necessary, the orientation of an image read from a document is made coincident in advance with the orientation of a non-printing surface (an address side in the case of a postcard) being the back side of the image-printed one surface or the printing surface. Therefore, it is possible to form an image according to the orientation of the image recording medium set in the paper feed cassette or the paper feed tray of the image forming apparatus. Thus, a desired printing result can be acquired.

In the above embodiment, a case is described in which an image read from a document is printed on a communication side of a postcard. However, the image recording medium does not have to be limited to a postcard. The image recording medium in which an image is printed on one surface or a predetermined printing surface includes envelopes, paper with holes for binding (such as loose-leaf paper), and a configuration in which an image read from a document is printed on a printing surface of a clear file. In the case of an envelope, an image read from a document (for example, the sender's address and name) is printed on the back side of the communication side. In the case of paper with holes for binding and a clear file, an image read from a document is printed on one surface that is determined as a printing surface by the user.

In this way, when printing on another image recording medium is performed, an image on a printed one surface or an image on a non-printing surface is prepared in advance, similarly to the address side of a postcard, and is used when a preview screen is displayed.

In addition, the screens shown in the above embodiment are merely examples, and can be modified as necessary in an actual product.

Figure 12A:
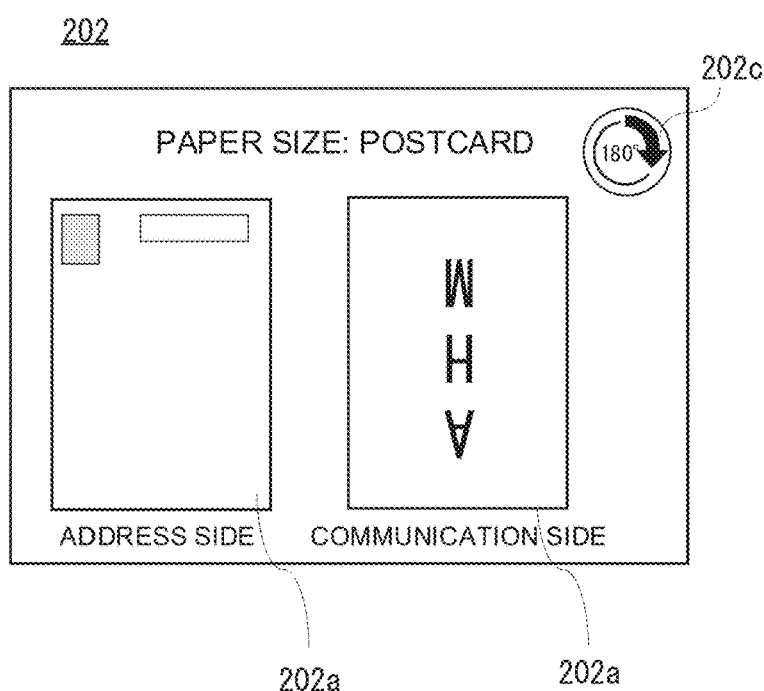
FIGS. 12A and 12B are diagrams showing another display example of the preview image.
Figure 12B:
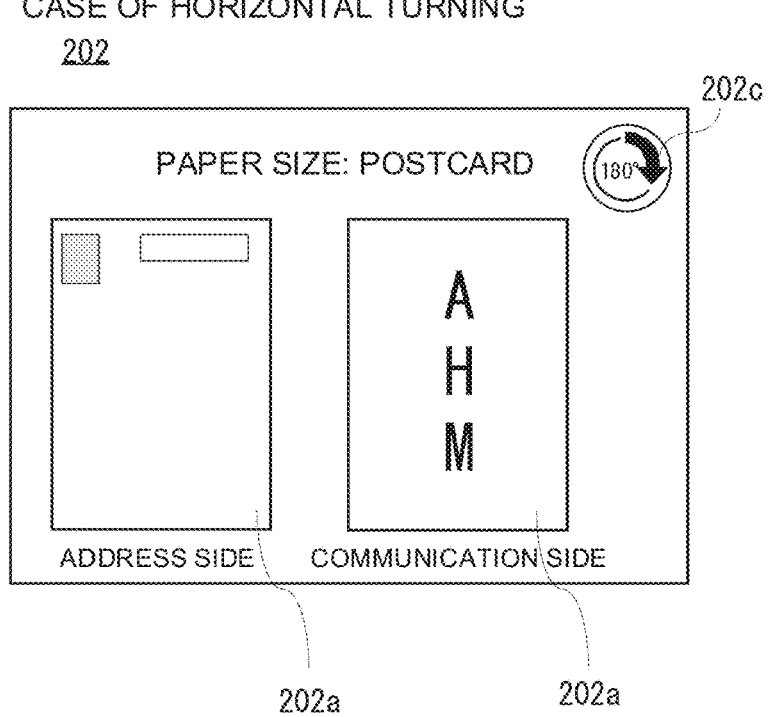

For example, on the preview screen 200, the preview image 202a on the address side and the preview image 202a on the communication side are displayed by switching. Alternatively, as shown in FIGS. 12A and 12B, a preview image 202a on the address side, and a preview image 202a on the communication side may be displayed side by side. FIG. 12A shows a display area 202 when vertical turning is set as a way of turning, and FIG. 12B shows a display area 202 when horizontal turning is set as a way of turning.

However, since the other parts of the preview screen 200 are the same, they are omitted in FIGS. 12A and 12B. In the examples shown in FIGS. 12A and 12B, a case that orientations of the address side and the communication side are correct is shown.

In the examples shown in FIGS. 12A and 12B, the preview image 202a on the address side and the preview image 202a on the communication side can be viewed at the same time (or together). Since it is possible to know the orientation of the address side by the preview image 202a on the address side, it is not necessary to display the instruction image 202b. Also, since it is not necessary to switch between the preview image 202a on the address side and the preview image 202a on the communication side, it is not necessary to display the instruction image 202d. Also, even when any position on the display area 202 other than the area where the button 202c is displayed is touched, the preview screen 200 does not change.

In addition, in the flowchart shown in FIGS. 9 to 11, as far as the same result can be acquired, the order of processing can be changed as necessary. In addition, a case has been described in which the CPU 12 performs the postcard print control process according to the flowchart shown in FIGS. 9 to 11. However, a part of the process can also be executed by another processor. As one example, a process of displaying various screens (including a generation process) may be executed by a GPU under the instruction of the CPU 12.

The present invention is not limited to a configuration of an apparatus called an image forming apparatus, and can be provided also in the form of a program (software) called a control program for the image forming apparatus, and in the form of a method called a control method of the image forming apparatus.

Processing of each unit may be performed by providing and recording the program in a computer-readable recording medium, and causing a computer system to read and execute the program recorded in the recording medium. It should be noted that the "computer system" herein includes hardware such as an OS and peripheral devices.

The "computer-readable recording medium" is a storage device such as a portable medium including a flexible disk, a magneto-optical disk, an ROM, and a CD-ROM, and a hard disk built into a computer system.

What is claimed is:

1. An image forming apparatus including a paper feeder in which an image recording medium having a first surface on which a first image is formed or a predetermined printing surface is set, the image forming apparatus comprising:
   an image inputter that inputs a second image to be formed on a second surface opposite the first surface or the predetermined printing surface of the image recording medium; and
   a display unit that causes a display to display:
      orientation information indicating an orientation of the first image or an orientation of a surface being a back side of the predetermined printing surface; and
      the second image that is input by the image inputter.

2. The image forming apparatus according to claim 1, further comprising an orientation changer that rotates an orientation of the second image by a predetermined angle.

3. The image forming apparatus according to claim 2, wherein the predetermined angle is an angle optionally set.

4. The image forming apparatus according to claim 1, wherein the display unit displays the first image or the surface being a back side of the predetermined printing surface.

5. The image forming apparatus according to claim 1, wherein the display unit displays the orientation information together with the second image.

6. An image forming apparatus including a paper feeder in which an image recording medium having a first surface on which a first image is formed or a predetermined printing surface is set, the image forming apparatus comprising:
an image reader that reads, from a document, a second image to be formed on a second surface opposite the first surface or the predetermined printing surface of the image recording medium;
a display unit that causes a display to display the second image that is read by the image reader; and
an orientation changer that rotates an orientation of the second image by a predetermined angle,
wherein the display unit displays orientation information indicating an orientation of the first image or an orientation of a surface being a back side of the predetermined printing surface.

7. The image forming apparatus according to claim 6, wherein the predetermined angle is 90 degrees.

8. The image forming apparatus according to claim 6, wherein the display unit displays the first image or a surface being a back side of the predetermined printing surface.

9. The image forming apparatus according to claim 6, wherein the display unit displays the orientation information together with the second image.

10. A non-transitory computer-readable recording medium with stored instructions for causing a computer of an information processing apparatus to execute a control method, the information processing apparatus comprising a display unit for displaying an image to be formed on an image recording medium, wherein
the image recording medium has a first surface on which a first image is formed or a predetermined printing surface, and
the control method includes:
causing, by the display unit, a display to display orientation information indicating an orientation of the first image or an orientation of a surface being a back side of the predetermined printing surface and a second image to be formed on a second surface opposite the first surface or the predetermined printing surface of the image recording medium.

11. A non-transitory computer-readable recording medium with stored instructions for causing a computer of an information processing apparatus to execute a control method, the information processing apparatus comprising: an image acquirer; a display unit for displaying an image to be formed on an image recording medium; and an orientation changer, wherein
the image recording medium has a first surface on which a first image is formed or a predetermined printing surface,
the control method includes:
acquiring, by the image acquirer, a second image to be formed on a second surface opposite the first surface or the predetermined printing surface of the image recording medium;
causing, by the display unit, a display to display the second image that is acquired by the image acquirer; and
rotating, by the orientation changer, an orientation of the second image by a predetermined angle, and
the display unit displays orientation information indicating an orientation of the first image or an orientation of a surface being a back side of the predetermined printing surface.

* * * * *